(12) United States Patent
Danger et al.

(10) Patent No.: US 10,607,006 B2
(45) Date of Patent: Mar. 31, 2020

(54) SECURITY SUPERVISION

(71) Applicant: SECURE-IC SAS, Cesson-Sévigné (FR)

(72) Inventors: Jean-Luc Danger, Antony (FR); Sylvain Guilley, Paris (FR); Thibault Porteboeuf, Paris (FR)

(73) Assignee: SECURE-IC SAS, Cesson-Sevigne (FR)

( * ) Notice: Subject to any disclaimer, the term of this patent is extended or adjusted under 35 U.S.C. 154(b) by 211 days.

(21) Appl. No.: 15/661,906

(22) Filed: Jul. 27, 2017

(65) Prior Publication Data

US 2018/0032723 A1  Feb. 1, 2018

(30) Foreign Application Priority Data

Aug. 1, 2016  (EP) ..................................... 16305998

(51) Int. Cl.
| | |
|---|---|
| *G06F 21/55* | (2013.01) |
| *G06F 11/32* | (2006.01) |
| *G06F 11/30* | (2006.01) |
| *G06F 21/56* | (2013.01) |
| *G06F 21/76* | (2013.01) |

(Continued)

(52) U.S. Cl.
CPC ............ *G06F 21/552* (2013.01); *G06F 11/10* (2013.01); *G06F 11/3058* (2013.01); *G06F 21/554* (2013.01); *G06F 21/566* (2013.01); *G06F 21/76* (2013.01); *G06N 5/045* (2013.01); *G06F 11/327* (2013.01)

(58) Field of Classification Search
None
See application file for complete search history.

(56) References Cited

U.S. PATENT DOCUMENTS

| | | | | | |
|---|---|---|---|---|---|
| 5,414,833 | A | * | 5/1995 | Hershey ................ | H04L 63/145 726/22 |
| 6,985,845 | B1 | * | 1/2006 | Pisarsky ............... | G06F 21/554 703/2 |
| 2007/0162964 | A1 | | 7/2007 | Wang et al. | |

(Continued)

OTHER PUBLICATIONS

European Search Report for 163059983 dated Oct. 31, 2016.

*Primary Examiner* — Fatoumata Traore
(74) *Attorney, Agent, or Firm* — Meagher Emanuel Laks Goldberg & Liao, LLP (57) ABSTRACT

There is disclosed a system for monitoring the security of a target system (110) with a circuit (120), the target system (110) comprising at least one processor (111) and wherein: the circuit (120) comprises a finite-state machine (122) configured to receive data from one or more sensors (130) distributed in the target system (110), at least one sensor (1303) being located on the processor (111) of the target system (110); the finite-state machine (122) is configured to determine a state output in response to data received from sensors (130); the system monitoring the security based on said state output. Developments describe the use of a self-alarm mechanism comprising an encoder to encode states with redundancy, the application of an error correction code, comparisons with predefined valid encoded states, the triggering of an alarm to the processor, the determination of actions and/or retroactions on sensors and/or diagnostics and countermeasures.

13 Claims, 3 Drawing Sheets

(51) Int. Cl.
*G06F 11/10* (2006.01)
*G06N 5/04* (2006.01)

(56) References Cited

U.S. PATENT DOCUMENTS

| | | | | |
|---|---|---|---|---|
| 2011/0264967 | A1* | 10/2011 | Lovy | H04L 41/0233 |
| | | | | 714/49 |
| 2015/0074422 | A1* | 3/2015 | Meyer | G06F 21/556 |
| | | | | 713/189 |
| 2015/0161379 | A1* | 6/2015 | Korman | G06F 21/55 |
| | | | | 726/1 |

* cited by examiner

SECURITY SUPERVISION

TECHNICAL FIELD

The invention generally relates to the field of digital data processing and more particularly to the field of computer security.

BACKGROUND

Embedded systems can be attacked in many different ways. Attacks can be logical (e.g. "fuzzing", cryptanalysis, abuse of weaknesses or flaws of poorly designed APIs) and/or physical (e.g. side-channel or fault injection attacks). Attacks can target different layers (e.g. hardware, firmware, operating system, applicative layers, etc). Attacks can be performed very fast over time. A single weakness can jeopardize the security of an entire system.

In existing embedded systems, security supervision can be performed in many different ways. Security supervision can be performed by using a coprocessor. Alternatively, security supervision can use time sharing of a given processor (i.e. in an interleaved way with a current execution thread). In both cases, the latency associated with the detection of an attack and the further triggering of an alarm can constitute a security weakness which can be further leveraged by attackers. Also, the security supervision mechanisms themselves can be attacked.

Existing approaches to secure embedded systems in a fast and reactive way are generally insufficient. For example, US20070162964 entitled "Embedded system insuring security and integrity, and method of increasing security thereof" presents limitations.

There is a need for advanced methods and systems of securing embedded systems.

SUMMARY

There is disclosed a system for monitoring the security of a target system with a circuit, the target system comprising at least one processor and wherein: the circuit comprises a finite-state machine configured to receive data from one or more sensors distributed in the target system, at least one sensor being located on the processor of the target system; the finite-state machine is configured to determine a state output in response to data received from sensors; the system monitoring the security based on said state output. Developments describe the use of a self-alarm mechanism comprising an encoder to encode states with redundancy, the application of an error correction code, comparisons with predefined valid encoded states, the triggering of an alarm to the processor, the determination of actions and/or retroactions on sensors and/or diagnostics and countermeasures.

Advantageously, embodiments of the invention allow for very fast response times, typically within the order or magnitude of a clock cycle (or a few code instructions). Such reactivity can be an advantageous counter-measure to the ever-increasing furtivity and speed of attacks.

Advantageously, a security supervision circuit or logic according to the invention can be protected with its own defense mechanisms ("self-protection mechanism").

Advantageously, in an embodiment, the system according to the invention can handle a diversity of security rules or policies (via the management of thresholds in error detection and/or correction codes, the adaptive reconfiguration of the sensitivity of sensors quantifying the environment, etc.)

Advantageously, embodiments of the invention can be adapted to various contexts of execution. In particular, embodiments of the invention can allow protecting large "surfaces" of attacks associated with complex systems (i.e. presenting numerous flaws or opportunities to attack), for example in the context of the Internet of Things (IoT) or of complex system-on-chips (SoC).

BRIEF DESCRIPTION OF DRAWINGS

Embodiments of the present invention will now be described by way of example with reference to the accompanying drawings in which like references denote similar elements, and in which.

DETAILED DESCRIPTION

In some embodiments, the invention manipulates one or more "finite-state-machines", "decision logic" circuits and "sensors" to supervise the security of a "monitored system" or "embedded system" comprising a "processor".

The term "finite-state machine", acronym FSM, designates a mathematical model of computation used to design both computer programs (i.e. software) and sequential logic circuits (i.e. hardware). Embodiments of the invention can be exclusively in software, or exclusively in hardware or combine both software and hardware embodiments).

In a digital circuit, an FSM can be built using a programmable logic device, a programmable logic controller, logic gates and flip flops or relays. Depending on embodiments, a FSM can be a Moore machine or a Mealy machine. In a Moore machine, a FSM uses only entry actions, i.e. output depends only on the state. The advantage of the Moore model is a simplification of the behavior of the FSM. In an embodiment, the FSM can be a Mealy machine. In a Mealy machine, the FSM uses only input actions, i.e. output depends on input and state. The use of a Mealy FSM leads often to a reduction of the number of states. In an embodiment, a FSM can be a UML (acronym for Unified Modeling Language) machine.

More generally, in the present description, the expression "finite-state machine" or finite-state machine FSM can be replaced by a "controller".

A finite-state machine (FSM) can be in one of a finite number of states. A finite-state machine FSM can be in only one state at a time. The state it is in at any given time is called the current state. A finite-state machine FSM can change from one state to another state ("transition") when initiated by a triggering event or condition. A particular finite-state machine FSM is defined by a list of its states and by the triggering condition for each transition. A state machine can be represented by a state transition table or list or graph, showing for each state the corresponding new state or "output state". It can also be represented by a directed graph called a state diagram. Each of the states can be represented by a node (circle), while edges (arrows) can show the transitions from one state to another state.

The term "processor" designates a processor as a whole or a core of a processor (in a multi-core or a manycore processor). A processor manipulates information ("information processor"). A processor can be designed conforming to the Von Neumann architecture (containing a processing unit and a control unit). A processor can be or comprise one or more of a microprocessor, a single integrated circuit (IC), an application-specific instruction set processor (ASIP), a System-On-a-Chip (SOC), a Graphics processing unit (GPU), a Physics Processing Unit (PPU), a Digital Signal Processor (DSP), a Floating-point unit (FPU), a Network processor, a Multi-core processor, a Many-core processor, a virtual processor, etc. In an embodiment, a processor is a Central Processing Unit (C.P.U.).

The term "sensor" beyond its literal meaning designates a hardware device configured to perform one or more measures in the environment and/or compute data derived from said measures. In an embodiment, a sensor can be a "probe". A sensor can be an "environmental" sensor. A sensor can detect logical (e.g. tables overflow, control flow graph violation, etc.) and/or physical (e.g. timing, temperature, voltage change) abnormalities or exceptions or weak signals or errors. A sensor can measure that the local environment is (or is getting) outside the nominal conditions (i.e. which performs an instant measure and/or a drift measurement). In an embodiment, the measure and/or drift measure is performed locally. In an embodiment, the evolution of measures is determined remotely.

Regarding space, sensors according to the invention can be scattered in space (placed at some locations on the chip, so as to optimize the probability of detection of even very local attacks). A sensor can be accessed at short distance (placed on the circuit or closed to the circuit to be monitored) and/or at remote distance (a sensor of a distant embedded system Ai can be accessed by a system according to the invention placed on an embedded system B and vice versa).

Regarding time, depending on embodiments, data received from sensors can be received or retrieved continuously, permanently, intermittently, regularly or opportunistically.

The terms "embedded system" or "monitored system" designate a system, generally computerized, with a dedicated function within a larger mechanical or electrical system, often with real-time computing constraints. An embedded system can control a plurality of other devices. Embedded systems are generally associated with low power consumption, small size, rugged operating ranges, and low per-unit cost (economies of scale). Current embedded systems can comprise one or more of a microcontroller or a microprocessor (e.g. DSP digital signal processor). The complexity of an embedded system can range from a low complexity (e.g. single microcontroller chip) to a very high complexity (e.g. network of interconnected units). Embedded systems are commonly found in consumer, industrial, automotive, medical, commercial and military applications. These expressions thus to a wide diversity of systems (i.e. objects, devices, appliances, robots, etc) located in various environments (e.g. domotics, smart city, Internet of Things, grid, cloud computing, etc).

Figure 1:
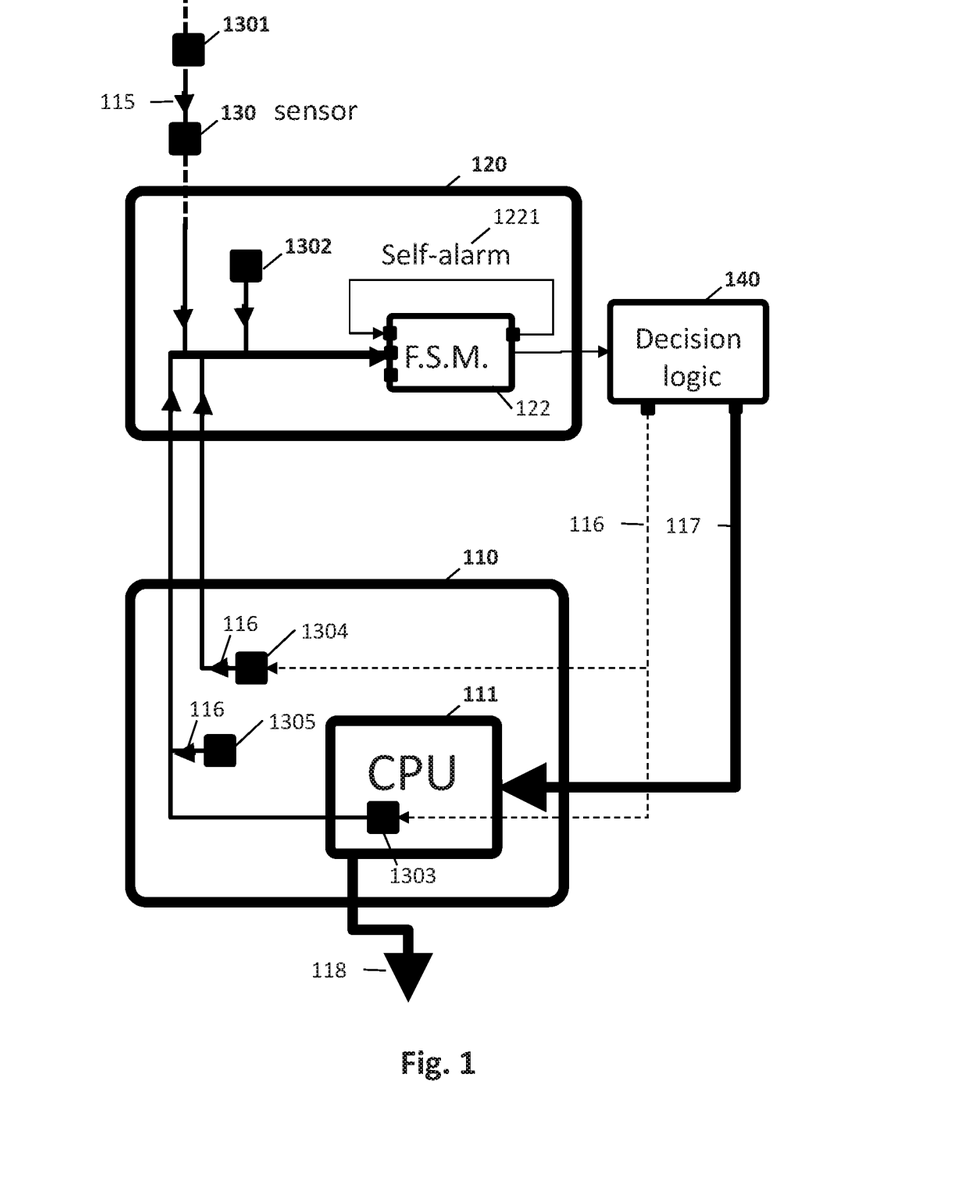
FIG. 1 illustrates an embodiment of the security supervision according to the invention.

FIG. 1 shows a specific embodiment of the invention.

The circuit 120, aggregating data from distributed sensors 130 is further associated with a decision logic circuit 140 which in turn controls at least one processor 111 located in the system 110 to be monitored. The processor 111 can control 118 one or more actuators (not shown), retroacting on the monitored system 110. In such a framework, the processor 111 can be considered as offering a privileged access for the control of the monitored system (there may be other control paths, but not necessarily presenting direct control accesses).

In an embodiment, there is disclosed a method for supervising the security of a (target) system 110 with a circuit 120, the system 110 comprising at least one processor 111, the circuit 120 comprising a finite-state machine 122 associated with a decision logic 140 and associated with one or more sensors distributed in the system 110, the method comprising the steps of the finite-state machine 122 receiving data from a plurality of hardware sensors 130, at least one sensor 1303 being located in or on the system 110; the finite-state machine 122 determining a state output in response to data received from the plurality of hardware sensors; the finite-state machine 122 being protected by a self-alarm mechanism 1221 monitoring the finite-state machine 122; the decision logic 140 determining one or more actions in response to the state output of the finite-state machine 122 and communicating one or more actions to the processor 111.

In some embodiments, the processor 111 can be interpreted as the "brain" of the target system 110. It centralizes information, compiles and/or processes information, determines the effects of the environment applied to the target system. It also offers a privileged access for the (feedback) control of the monitored system. In an embodiment, the at least one sensor 1303 is located or is placed in or on said at least one processor 111 of the system 110. This advantageously allows a "direct" feedback. In other embodiments, the at least one sensor 1303 is located in the system 110 but not in said at least one processor 111 (this still allows for "indirect" feedbacks of events or attacks, as determined by the "brain" or logical circuits of the target/monitored circuit).

The supervision circuit 120 comprises a finite state machine 122, the finite-state machine FSM being, optionally, self-protected by a self-alarm mechanism 1221 and being associated with an decision logic 140 block 140, the decision logic 140 block controlling at least one sensor 130 placed in the monitored system and being configured to send one or more messages to the at least one processor of the monitored system.

A message can comprise qualified information, e.g. priority information, threat levels, probability information, etc. The message transmitted by the decision logic 140 can be implicitly formatted in the appropriate format so that the processor can handle it. In another embodiment, the formatting step is performed by the processor itself.

In an embodiment, the finite-state machine FSM 122 receives data (raw measures and/or interpreted raw measures) stemming from one or more sensors 130 (e.g. 1301, 1303, 1303, etc). The finite-state machine FSM is self-protected by a protection mechanism 1221. The finite-state machine FSM 122 outputs data to the decision logic 140, which in turn controls one or more sensors and/or controls the processor 111 associated with the monitored system 110.

The described cybernetic regulation enables a reactive if not an adaptative security supervision system. If the monitored system changes, the supervision can change accordingly. The continuous adaptation of the supervision system to its monitored system enables the supervision to maintain itself in a viable state, through sensory feedback mechanisms (i.e. enabled by sensors). Even more, if the monitored system remains stable, the proposed monitoring can be changed, for example thereby allowing evolutive sensitivity.

In an embodiment, the method further comprises the step of the decision logic 140 controlling at least one of the sensors 130. In an embodiment, the method further comprises the step of the finite-state machine comparing data communicated by one or more sensors with one or more predefined values or ranges of values. Hardware embodiments also can be configured to perform the preceding steps.

In an embodiment, one or more sensors can be configurable. In an embodiment, one or more sensors can be controlled by the decision logic 140.

In an embodiment, a sensor is "passive" (it measures and sends measurements results; it cannot be remotely controlled). In an embodiment, a sensor is "active" (it measures and sends measurements results and can be adjusted remotely, for example by adjusting sensitivity). In an embodiment, a sensor is static (it is configured once for all). In an embodiment, a sensor is "dynamic" (it is configurable, in real time).

Sensors can be placed at various locations (the term "in" can be substituted by a term or expression like "on", "on top of", "below", "inside", "integrated into", "next to", "adjacent to", etc). A sensor can be placed at a remote distance from the circuit 120, like the sensor 1301. A sensor can be placed in the circuit 120, like sensor 1302. A sensor can be placed in the processor, like sensor 1303, or outside like sensor 1304.

A sensor can be placed onto/into/inside the processor. A network of sensors can be distributed on the surface of the processor and/or the circuit to be monitored. Sensors can be placed at immediate proximity or be remotely accessed as in the context of the "Internet of Things". There can be determined an optimal placement of sensors adapted to certain types of attacks. The placement of sensors can be random (for example at first and later further refined). The manufacturing of the processor can be progressively or reactively improved. In some embodiments, one or more sensors can be displaced to adjust sensitivity to attacks. In some embodiments, one or more sensors can autonomously move, for example within short distances.

In an embodiment, one or more sensors are controllable. For example, the decision logic circuit 140 can be further configured to control at least one of the sensors 130.

In an embodiment, a sensor is a hardware sensor selected from the group comprising a sensor measuring a physical value of the environment and a sensor configured to determine data integrity. A sensor measuring a physical value of the environment can send a real value. A sensor configured to determine the logic integrity can use a memory for determining storing and comparing CRC (Cyclic Redundancy Check) values, integrity of TMR (Triple Modular Redundancy) type.

In an embodiment, a sensor is a software sensor selected from the group comprising a cyber-sensor configured to determine invariants out of data injected in the system 110 and an emulated sensor mobilizing idle resources of the processor 111 to perform security tests. Idle resources in a system can play the role of sensor. For example, idle CPU resources can be used to carry out integrity computations. In case of an attack, the mobilized resources may detect an error and report it. The complexity of a circuit can be leveraged to better fight an adversary, by using unused or under-used computing resources. In other words, the complexity of an embedded system which increases the surface of attacks—can also be leveraged to combat said attacks by mobilizing available resources.

In an embodiment, the supervision circuit 120 and the target system 110 are manufactured together, i.e. are part of a same manufactured product (they are connected parts in a particular configuration). In some embodiments, the supervision circuit 120 is connectible or releasable or attachable or linkable or moveable onto the target system 110. The supervision circuit 120 thus can be used as an additional or external or supplemental hardware (for security or test purposes). In an embodiment, the association of the two parts 110 and 120 is reversible. In an embodiment, the association is irreversible. The physical connection for example can use adhesive and/or glue and/or electrical connection and/or magnetic connection. One or more sensors also can be connectible or releasable or attachable or moveable (some sensors can be at predefined locations while some others can be dynamically attached). The different parts of the global system thus can be rearranged in diverse ways, statically or dynamically (e.g. over time).

Figure 2:
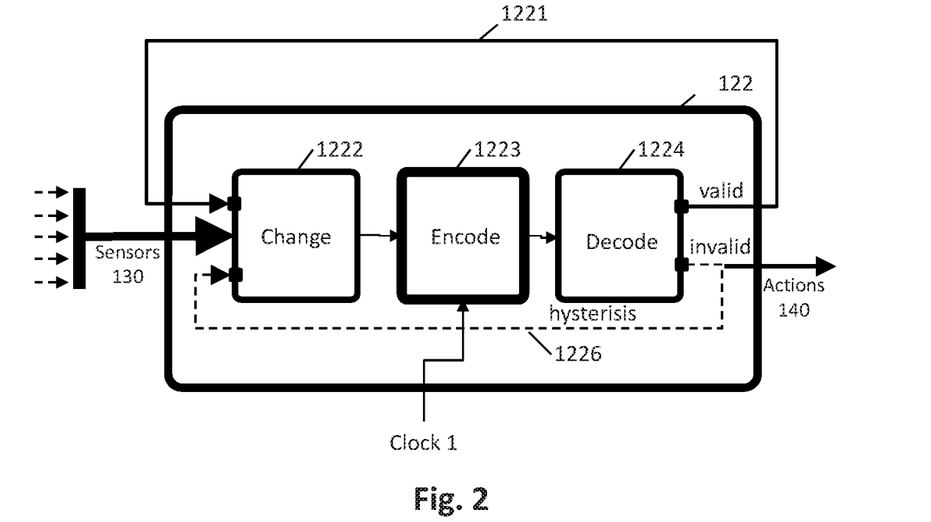
FIG. 2 details exemplary aspects of the finite-state machine FSM according to the invention.

FIG. 2 shows examples of details of the finite-state machine FSM 122 according to the invention.

According to the invention, in order to achieve error detection of states of the finite-state machine FSM 122, redundancy can advantageously be added (i.e. some extra data used to check consistency and/or to recover data determined to be corrupted). Error detection is the detection of errors for example caused by noise or other impairments during transmission from a sender to a receiver. If there is $2^n$ states, it may not be possible to use redundancy to verify that a given state of the FSM (represented by n bits) is free of errors. For example, the "next state" can be produced along with a CRC or encoded using a code. Doing so, in the context of the invention, the modified FSM. can receive as an input the current state, so as to enable an hysteresis. In other words, the criticity of the actions to take can depend on the former values of the criticity. In addition, the criticity can remain high despite all the sensors reverted to normal. Indeed, it can be expected that the calm situation is that between two assaults of an attack or the security policy could imply that, once an attack is detected, or a redefined number of attacks, the component will never revert to 'normal' situation.

In an embodiment, there is used an Error Detection Code (EDC) in order to "surcode" states of the FSM. Error detection schemes can use repetition codes and/or parity bits and/or checksums and/or Cyclic redundancy checks (CRCs) and/or Cryptographic hash functions and/or Error-correcting codes.

Further to error detection, error correction can be used. Error correction comprises the detection of errors and reconstruction of the original, error-free data. Error correction can be realized by "backward error correction" (also called "automatic repeat request") and/or by "forward error correction (FEC). Both can be combined ("hybrid automatic repeat-request"). An error-correcting code can be used for error detection. A code with minimum Hamming distance d, can detect up to d−1 errors in a code word. Using minimum-distance-based error-correcting codes for error detection can be suitable if a strict limit on the minimum number of errors to be detected is desired. Codes with minimum Hamming distance d=2 can be used to detect single error(s).

In an embodiment, the finite-state machine 122 performs the steps of encoding 1223 at least one state with redundancy, by applying an error correction code, the error correction code being associated with a threshold or a minimum distance. In an embodiment, the finite-state machine further can determine that an encoded state is valid by reference to a plurality of predefined valid encoded states, then decode 1224 said encoded state into a decoded state and communicate said decoded state to the decision logic 140 and to the state change logic 1222.

In other words, the block 1223 stores the FSM state in an encoded form (according to the invention, i.e. explicitly adding redundancy to the state representation). Specifically, an encoded state can consists in a codeword, which codeword is obtained by application of an error detection code (EDC) on a "plain" state. An error detection code is associated by a minimum distance d.

In an embodiment, the block 1224 performs the following steps. If the output of the encoding state block 1223 (i.e. an encoded state) is a "valid" codeword, then this valid codeword is decoded by the decoding block 1224, and then the decoded state is sent to the decision logic 140 and to the state change logic 1222. In parallel, the self-alarm bit (1221) is set to de-asserted.

In an embodiment, the finite-state machine FSM 122 can comprise a state change logic S.C.L. 1222, an encoded state 1223 and a decoded state 1224. The state change logic S.C.L. can be a table and/or a list and/or a graph determining the state transitions of the finite-state machine FSM (e.g. lists of states and triggering conditions for each transition). The state change logic S.C.L. can receive and aggregate data communicated by sensors. The heartbeat can be given at 1223. The state transition 1221 corresponds to the determination of the next planned state which corresponds to the encoded state 1223 as a result of the state change logic 1222. If the encoded state 1223 is not correct (e.g. not possible, not consistent, decoding is bad, etc), a hysteresis 1226 occurs (bad decoding). If the self-alarm 1221 is triggered, the state change logic S.C.L. can be modified. If the decoded state is correct, it is communicated to the decision logic 140.

In an embodiment, the method further comprises, in response of determining that an encoded state is not valid by reference to a plurality of predefined valid encoded states, the step of triggering the self-alarm mechanism 1221. Otherwise, if the output of the encoding block 1223 (i.e. a decoded state) is not a valid codeword, then the self-alarm bit 1221 can be asserted (or not).

The finite state machine itself indeed can emit alarms in case some inconsistency is detected in its state. It is advantageous to protect the supervision hardware, as an attack could consist in deactivating it, and subsequently attacking the chip or monitored system deprived from supervision.

In a further embodiment, if the self-alarm 1221 is triggered (in other words, a decoded state is not licit) then the finite-state machine FSM 122 and/or the decision logic can directly raise an alarm to the processor 111.

Depending on the configuration of the decoding block 1224, the hysteresis signal 1226 can carry two kinds of information. On one hand, the value of the hysteresis signal 1226 can be a special state, for example indicating an error in the circuit 120. This for example allows the decision logic module (140) to take decisions at once, hence enabling a prompt notification to the CPU 111. On the other hand, provided the number of faulted bits is low enough (for example when the number of faulted bits is inferior or equal to $(d-1)/2$), then the plain codeword can be decoded, despite the errors. In such as case, the FSM can be informed via the self-alarm 1221 that an error has occurred, but its operation can continue, despite the error. Such a configuration can be advantageous for dependable systems, which must be both secure (i.e. wherein a threat must be reported) and safe (i.e. which must keep working as long as possible). In an embodiment, if an attack is determined, dummy data (e.g. random and/or predefined data) can be sent out. This advantageously can avoid alerting the attacker. In order to minimize the leak of information and/or detection by an attacker, the method can further comprise steps of determining and/or selecting and/or performing predefined countermeasures, said countermeasures being known to minimize detection probability by an attacker.

In an embodiment, the method further comprises the finite-state machine FSM 122 performing the step of determining a diagnostic between a plurality of predefined diagnostics in response to said comparisons, said predefined diagnostics comprising one or more of a normal situation, a false positive, a local or a global fault, a local or a global defect, a physical attack or a cyber-logical attack.

For example, the finite-state-machine acting as a "sentinel" can determine one or more of the following diagnostics:
- a "normal situation", wherein data communicated by sensors are within predefined normal ranges;
- a "false positive" in response to the detection of a small, sudden and transitory variation in sensors' data;
- a "fault", for example if one or more response values of a sensor are not those associated with those of a "normal" and/or "nominal" and/or "stable" sensor (e.g. collection of values or ranges of values which are associated with normal and/or nominal conditions, predefined thresholds, etc); or by detecting a variation in sensor's data, said variation being inferior to a predefined threshold, being sudden when compared to a predefined time interval and being continue over a predefined time interval;
- a "local defect" in the system to be monitored, for example by detecting a variation in sensor data superior to a predefined threshold, said variation being repeated on a number of sensors below a predefined threshold; the determination of a local defect can be indicative of a focused attack.
- a "global defect" in the system to be monitored by detecting a variation in sensor(s) data superior to a predefined threshold, said variation being repeated on a number of sensors in excess of a predefined threshold;
- a "cyber-attack" if substantially all hardware sensors do not detect any abnormal values while at least a software sensor detects an abnormal value.
- a "physical attack" if substantially all or a majority of sensors communicate abnormal values, for example by detecting an adverse laser scanning the target circuit, said scan being generally preliminary to an effective attack. Such an early detection for example can enable to raise alerts in adjacent sensors.

Figure 3:
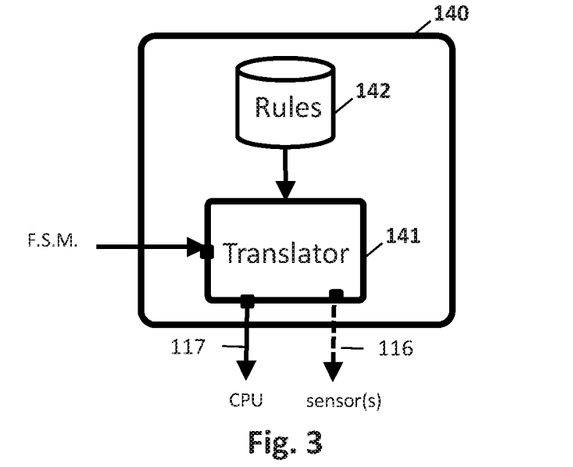
FIG. 3 details exemplary aspects of the decision logic circuit according to the invention.

FIG. 3 shows details of the decision logic 140.

In an embodiment, the decision logic 140 can comprise a hardware and/or software translator 141 which formats the output of the finite-state machine FSM and transmits the formatted output to the processor 111. In an embodiment ("passive control"), the output is configured to at least alert the processor (a mere message is sent to an unmodified processor and, in response to the message, the processor can modify its behavior). In an embodiment ("active control"), the output can, directly or not, trigger a change in the processor (an action is derived from the output, the control is active). Optionally, the translator 141 can be supplemented or in association with or controlled by a rules logic and/or repository 142, which in an embodiment is reprogrammable.

The block 141 can comprise one or more logic rules 142. Said rules can be local and/or remotely accessed and/or remotely locally uploaded. The rules can be predefined and/or dynamically defined.

In an embodiment, the logic rules 142 can be programmable.

In response to the diagnostic determined by the FSM., one or more countermeasures can be taken.

While in a simplified embodiment, the role of the finite-state-machine is to establish diagnostics and the role of the decision logic is to decide and execute actions based on said diagnostics, the definition of roles can be varied in many ways, decoupling or a contrario integrating one or more of the different steps of measuring, comparing, deciding, planning and retro-acting. In other words, the finite-state machine 122 and/or the decision logic 140 can contribute, directly or indirectly to the execution of downstream actions based on upstream measures.

In an embodiment, the method further comprises the decision logic 140 performing one or more steps selected from the group comprising modifying one or more thresholds in one or more sensors, resetting one or more sensors, deactivating temporarily or permanently one or more sensors.

Alternatively (i.e. independently) or in combination with the determination of the diagnostic by the finite-state-machine 122, the decision logic can modulate the regulation of the retroaction loops.

In an embodiment, the method further comprises the decision logic 140 communicating a message to the processor 111, said message comprising one or more instructions for the processor to perform one or more actions selected from the group comprising terminating one or more services in the processor, deleting data in the processor, logging incidents, renegotiating a user session, soft resetting the processing, hard rebooting the processor, disconnecting one or more ports or networks, disconnecting power supply, physically damaging or destroying the processor.

Depending on measures or data comparisons performed by the FSM and/or the decision logic 140 block, the FMS and/or the decision logic 140 block can adjust and take a diversity of actions. Said actions or steps can be logical (e.g. based on rule(s)) and/or physical (e.g. applicable on sensor(s)).

Actions can comprise: doing nothing, modifying one or more thresholds (e.g. increase or decrease measurements or communications with sensors, increasing security levels through the adjustment of sensors, etc), resetting one or more sensors (temporary or not), deactivating one or more sensors (permanently or not), alerting the processor to anticipate an unqualified or tentatively qualified attack; killing one or more services and/or ports and/or sandboxing one or more processes, executing active defense (for example by executing predefined defense mechanisms), partially deleting data (e.g. local secrets), for example at first adjacent to the sensors, i.e. preferably wiping out memory units which are physically close to a compromised sensor; or memory/logical units logically related to said compromised sensor), up to global deletion (for example if attack(s) signals are repeated), logging or recording incidents, uploading data, alerting devices connected to the system to be monitored, renegotiating a user session, suspending the CPU thread, resuming, triggering soft and/or hard reboot, disconnecting power, physically damaging the processor (e.g. to protect data, for example by self-destruction, wrapping-up hardware junctions etc).

The actions can be multiple. For instance: a fuse, meaning that the system is under attack, can be set. The memory and/or bus encryption keys can be zeroized. Thus, at once, all program and data files are (all of the sudden) lost.

An action can be contextual, e.g. local. For example, it can be applied to a sensor located in a given area of the chip, so that the effects remain local to this area without altering the nominal activity of the other parts of the circuit.

It may sometimes be advantageous to postpone an action when an alarm is raised by a sensor or a group of sensors. Indeed, security is generally balanced with reliability. Some alarms might be caused my non-malicious user, such as the legitimate user (for example leaving the system is a very hot place like a wash machine, by mistake). Besides, an attacker usually does not succeed his/her attacks at once. He must train, in order to understand the response of the system to his solicitations (attack scenarios). Also, it is likely that any attack attempt touches many sensors: indeed, any kind of glitch propagates (for instance through the power/ground network) within the whole die, thereby touching many sensors simultaneously.

Figure 4:
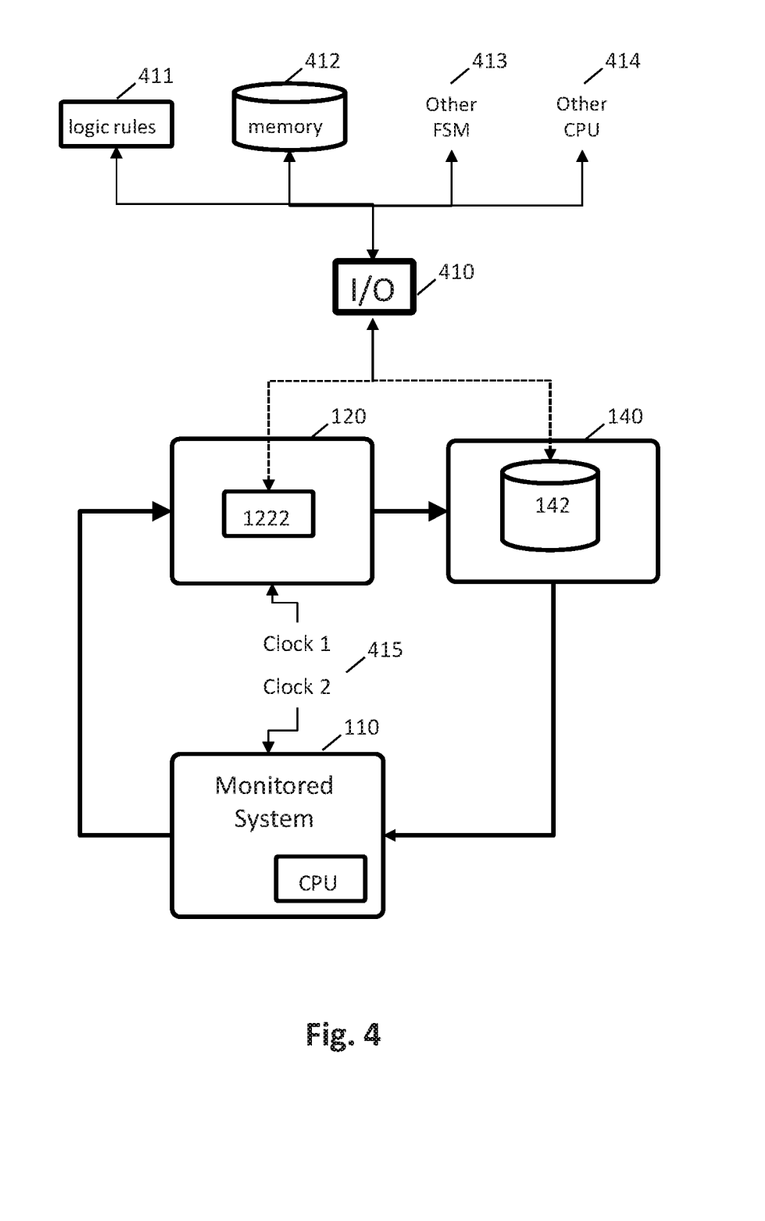
FIG. 4 shows various other aspects of the invention.

FIG. 4 shows various other aspects of the invention.

Networked FSM.s are now described.

In some embodiments, the system according to the invention can be "configurable" and/or "programmable". Processors and/or sensors and/or finite-state machines and/or decision logic circuits can be networked.

In an embodiment, the finite-state machine and/or the decision logic circuit 140 can further comprise input/output interfaces 410 adapted to configure the state change logic 1222 of the finite-state machine 122 and/or of the decision rules 142 accessed by the decision logic 140.

For example, the state change logic 1222 (e.g. tables, graphs) of the finite-state machine 122 can be configured via input/output interfaces 410. Likewise, the decision rules 142 accessed by the decision logic 140 can be updated or upgraded remotely. Remotely accessed security policies (e.g. rules) can be tested and/or implemented.

Depending on the situation (local topologies and interdependencies' schemes between monitored systems), a plurality of circuits 120 according to the invention (or subcomponents thereof) can be networked. For example, a first FSM.1 can cooperate with a second FSM.2 (as well as with other FSM.s 413), for example via shared logic rules 411, consolidating logic rules governing the detection of attacks and countermeasures.

The interconnections (and dependencies) between supervision circuits (finite-state machines 120 and/or decision logic 140) and processors or CPUs (111, 414) can be complex: for example, a first processor 1 can be interconnected with a second finite-state machine 2 while a second processor 2 can be linked to a first finite-state machine. Such embodiments can be advantageous in high-performance computing environments or any other context wherein a plurality of interconnected systems coexist (such as processor cores, render farms, clusters, etc).

At a lower level of details, the SCL 1222 within the circuit 120 and/or the rules database 142 can be reprogrammable, in a specific and optional embodiment. For this purpose, in an embodiment, the circuit 120 and/or the decision logic 140 are provided with I/O interfaces 410 which enable data update or upgrades (flashing, reprogramming, etc), from various data sources. It can be for example logic rules 411 retrieved remotely, memory or cache 412, bridges or links 413 for example to further FSMs 413 and/or other processors 414. This optional embodiment, featuring re-programmability, can be further secured on its own (e.g. verified and/or secured boot).

In other words, the SCL 1222 and/or the decision logic 140 endorse the "intelligence" of the supervision circuit according to the invention, while sensors distributed across the monitored system (and beyond) correspond to the surface covered by this "intelligence".

Temporal aspects are now discussed.

In an embodiment, the clock 1 of the circuit 120 according to the invention and the clock 2 of the processor 111 are independent clocks 415.

From a structural perspective, the term "independent" means that clock frequencies may be different. Advantageously, circuits 110 and 120 do not share a single-point-of-failure (for example can have different power supplies), share the minimal amount of circuits. In other words, in some embodiments the circuits 110 and 120 are entirely dissociated, or at least share a minimal amount of common circuitry.

The frequency of the finite-state machine FSM clock is equal or superior to the frequency of the clock of the processor, so as to be able to monitor it (passively) or supervise it (actively, controlling it to some extent). In an embodiment, the time quantum or heartbeat is randomly small. In an embodiment, the frequency is not configurable, i.e. there is no feedforward of the action acting on the state machine. In another embodiment, the clock is configurable, i.e. can be adaptative or adapted to the frequency of the processor.

Further embodiments are now described.

In an embodiment, there is described a system for monitoring the security of a target system (110) with a circuit (120), the target system (110) comprising at least one processor (111), wherein the circuit (120) comprises a finite-state machine (122); the finite-state machine (122) is configured to receive data from one or more sensors (130) distributed in the target system (110), at least one sensor (1303) being located on the at least one processor (111) of the target system (110); the finite-state machine (122) is configured to determine a state output in response to data received from sensors (130); the system monitoring the security of the target system (110), based on said state output.

In a development, the finite-state machine (122) comprises a self-alarm mechanism (1221) monitoring said finite-state machine (122).

In a development, the self-alarm mechanism comprises an encoder, said encoder being configured to encode with redundancy (1223) at least one state of the finite-state machine (122) into an encoded state by applying an error correction code, said error correction code being associated with a threshold and/or a minimum distance (e.g. a Hamming distance)

In an embodiment, if an encoded state is determined to be valid by reference to a plurality of predefined valid encoded states, the decoded state (1224) of said encoded state is communicated to the decision logic (140) and to the state change logic (1222).

In an embodiment, if an encoded state is determined to be invalid by reference to a plurality of predefined valid encoded states, the self-alarm mechanism (1221) is triggered and an alarm is communicated to the at least one processor (111).

In an embodiment, the finite-state machine (122) is further associated with a decision logic (140), said decision being configured to determine one or more actions in response to the state output of the finite-state machine (122).

In an embodiment, the decision logic (140) is configured to communicate said one or more actions to the processor (111) of the system (110).

In an embodiment, the decision logic (140) is configured to control at least one of the sensors (130).

In an embodiment, the decision logic (140) is configured to modify one or more thresholds in one or more sensors, to reset one or more sensors, and/or to deactivate temporarily or permanently one or more sensors.

In an embodiment, the finite-state machine (122) and/or the decision logic (140) are configured to compare data communicated by one or more sensors with one or more predefined values or ranges of values.

In an embodiment, the finite-state machine (122) is configured to determine a diagnostic between a plurality of predefined diagnostics in response to said comparisons of data, said predefined diagnostics comprising one or more of a normal situation, a false positive, a local or a global fault, a local or a global defect, a physical attack or a cyber-logical attack.

In an embodiment, the decision logic (140) is configured to determine one or more countermeasures in response to the diagnostic determined by the finite-state machine.

In an embodiment, the decision logic (140) is configured to communicate a message to the at least one processor (111), said message comprising one or more instructions for the processor (111), to perform one or more actions selected from the group comprising terminating one or more services executed in the processor, deleting data in the processor, logging incidents, renegotiating a user session, soft resetting the processor, hard rebooting the processor, disconnecting one or more ports or networks, disconnecting power supply, physically damaging or destroying the processor.

In a development, at least one a sensor is a hardware sensor selected from the group comprising a sensor measuring a physical value of the environment and a sensor configured to determine data integrity.

A sensor measuring a physical value of the environment sends a real value. A sensor configured to determine the logic integrity can be a memory for determining storing and comparing CRC values (e.g. integrity of type TMR).

In a development, at least one a sensor is a software sensor selected from the group comprising a cyber-sensor configured to determine invariants out of data injected in the system (110) and an emulated sensor mobilizing idle resources of the processor (111) to perform security tests.

Idle resources in a system can play the role of sensor. For example, idle CPU resources can be used to carry out integrity computations. In case of an attack, the mobilized resources may detect an error and report it. The complexity of a circuit can be leveraged to better fight an adversary, by using unused or under-used computing resources. In other words, the complexity of an embedded system which increases the surface of attacks—can also be leveraged to combat said attacks by mobilizing available resources.

In an embodiment, the finite-state machine and/or the decision logic circuit 140 further comprise input/output interfaces for the configuration of a state change logic 1222 of the finite-state machine 122 and/or of decision rules 142 accessed by the decision logic 140.

In an embodiment, the circuit according to the invention is "configurable" and/or "programmable". The state change logic 1222 of the finite-state machine 122 can be configured via I/O means 410. Remotely accessed security policies can be tested or implemented. Likewise, the decision rules 142 accessed by the decision logic 140 can be updated or upgraded remotely.

In addition, and optionally, in some embodiments, for example to fasten response times, zero, one or more caches can be used, zero, one or more buffers can be used, zero, one or more mass storages such as hard drives can be used, as well as elastic processing means ("cloud computing").

Other embodiments are now described.

In an embodiment, there is disclosed a hardware extension, located or positioned adjacent to a processor for example, which is interconnected with a plurality of sensors, which handles and aggregates alarms to determine a response, in a timely manner (typically within a few clock cycles, if not one single clock cycle).

In an embodiment, the system according to the invention can detect at least one attack, and in response to said attack, trigger an action within one single clock cycle.

Embodiments of the invention can be further protected by using obfuscation, deceiving protections, such as clock randomization or decoil operations, etc., which can force the attacker to be inaccurate in the injection of perturbations.

In some embodiments, an embedded system or monitored system is a circuit which can comprise one or more of a system-on-a-chip (SoC), a system-in-package (SiP), a package on package (PoP), an application-specific integrated circuit (ASIC), a field-programmable gate array (FPGA), a complex programmable logic device (CPLD), a multi-project chip (MPC), a very-large-scale integration (VLSI) circuit or an application-specific instruction-set processor (ASIP).

There is disclosed a method of monitoring the security of a target system (110) with a supervision circuit (120), the target system (110) comprising at least one processor (111), the circuit (120) comprising a finite-state machine (122); the method comprising the steps of the finite-state machine (122) receiving data from one or more sensors (130) distributed in the target system (110), at least one sensor (1303) being located in the target system (110); the finite-state machine (122) determining a state output in response to data received from said one or more sensors (130); and the supervision circuit monitoring the security of the target system (110) based on said state output; wherein the finite-state machine (122) comprises an encoder, said encoder being configured to encode with redundancy (1223) at least one state of the finite-state machine (122) into an encoded state by applying an error correction code, said error correction code being associated with a threshold and/or a minimum distance. Other method steps can be performed, as previously described.

Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. A supervision circuit monitoring the security of a target system, the target system comprising at least one processor, wherein:
the supervision circuit comprises a finite-state machine;
the finite-state machine is configured to receive data from one or more sensors, at least one sensor being located in the target system;
the finite-state machine is configured to determine a state output in response to data received from said one or more sensors;
the supervision circuit monitoring the security of the target system based on said state output, wherein the finite-state machine comprises a self-alarm mechanism monitoring said finite-state machine;
the self-alarm mechanism comprises an encoder, said encoder being configured to encode with redundancy at least one state of the finite-state machine into an encoded state by applying an error correction code, said error correction code being associated with a threshold and/or a minimum distance; and
if an encoded state is determined to be valid by reference to a plurality of predefined valid encoded states, the decoded state of said encoded state is communicated to the decision logic and to the state change logic.

2. The supervision circuit of claim 1, wherein if an encoded state is determined to be invalid by reference to a plurality of predefined valid encoded states, the self-alarm mechanism is triggered and an alarm is communicated to the at least one processor.

3. The supervision circuit of claim 1, wherein the finite-state machine is further associated with a decision logic, said decision logic being configured to determine one or more actions in response to the state output of the finite-state machine.

4. The supervision circuit of claim 3, wherein the decision logic is configured to communicate said one or more actions to the processor of the system.

5. The supervision circuit of claim 3, wherein the decision logic is configured to control at least one of the sensors, wherein the decision logic is configured to modify one or more thresholds in one or more sensors, and/or to reset one or more sensors, and/or to deactivate temporarily or permanently one or more sensors.

6. The supervision circuit of claim 1, wherein the finite-state machine and/or the decision logic are configured to compare data communicated by one or more sensors with one or more predefined values or ranges of values.

7. The supervision circuit of claim 6, wherein the finite-state machine is configured to determine a diagnostic between a plurality of predefined diagnostics in response to said comparisons of data, said predefined diagnostics comprising one or more of a normal situation, a false positive, a local or a global fault, a local or a global defect, a physical attack or a cyber-logical attack.

8. The supervision circuit of claim 7, wherein the decision logic is configured to determine one or more countermeasures in response to the diagnostic determined by the finite-state machine and/or wherein the decision logic is configured to communicate a message to the at least one processor, said message comprising one or more instructions for the processor to perform one or more actions selected from the group comprising terminating one or more services executed in the processor, deleting data in the processor, logging incidents, renegotiating a user session, soft resetting the processor, hard rebooting the processor, disconnecting one or more ports or networks, disconnecting power supply, physically damaging or destroying the processor.

9. The supervision circuit of claim 1, wherein a sensor is a hardware sensor selected from the group comprising a sensor measuring a physical value of the environment and a sensor configured to determine data integrity.

10. The supervision circuit of claim 1, wherein a sensor is a software sensor selected from the group comprising a cyber-sensor configured to determine invariants out of data injected in the system and an emulated sensor mobilizing idle resources of the processor to perform security tests.

11. The supervision circuit of claim 1, wherein the at least one sensor is located in or on the at least one processor.

12. The supervision circuit of claim 1, wherein the finite-state machine and/or the decision logic circuit further comprise input/output interfaces for the configuration of a state change logic of the finite-state machine and/or of decision rules accessed by the decision logic.

13. A method of monitoring the security of a target system with a supervision circuit, the target system comprising at least one processor, the supervision circuit comprising a finite-state machine; the method comprising:
- the finite-state machine receiving data from one or more sensors, at least one sensor being located in the target system;
- the finite-state machine determining a state output in response to data received from said one or more sensors;
- the supervision circuit monitoring the security of the target system based on said state output, wherein
- the finite-state machine comprises a self-alarm mechanism monitoring said finite-state machine;
- the self-alarm mechanism comprises an encoder, said encoder being configured to encode with redundancy at least one state of the finite-state machine into an encoded state by applying an error correction code, said error correction code being associated with a threshold and/or a minimum distance; and
- if an encoded state is determined to be valid by reference to a plurality of redefined valid encoded states, the decoded state of said encoded state is communicated to the decision logic and to the state change logic.

* * * * *